May 20, 1941.  H. G. ANDREWS  2,242,996
REPLACEABLE BEARING
Filed July 24, 1939
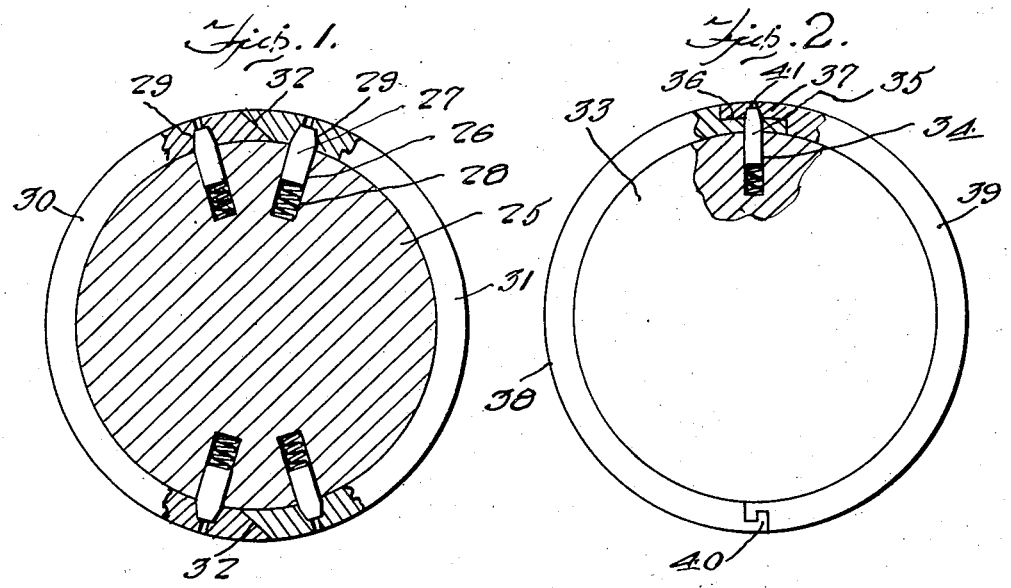
Inventor
H. G. Andrews
By Clarence A. O'Brien
and Hyman Berman
Attorneys Patented May 20, 1941

2,242,996

UNITED STATES PATENT OFFICE 2,242,996

REPLACEABLE BEARING

Henry George Andrews, Moskee, Wyo.

Application July 24, 1939, Serial No. 286,291

2 Claims. (Cl. 308—237)

This invention relates to new and useful improvements in bearing structures and more particularly to a bearing structure which can be readily replaced when excessive wear has taken place.

The principal object of the present invention is to provide a replaceable bearing structure especially adapted for crankshafts which can be readily applied and just as readily removed and which in use will compensate for much of the wear which is now inflicted on the usual crank pins or wrist pins should the present invention be employed in conjunction with the latter.

Other important objects and advantages of the invention will become apparent to the reader of the following specification.

In the drawing:

Figure 1 is a cross sectional view showing one form of the invention.

Figure 2 is a cross sectional view showing another form of the invention.

Referring to the drawing wherein like numerals designate like parts, it can be seen that numeral 25 denotes a bearing pin or shaft which is bored to form recesses 26 arranged in radially disposed pairs and in each of these recesses is disposed a plunger 27 forced outwardly by a compression spring 28. The outer ends of these plungers 27 are beveled for ready catching engagement with the tapered recesses 29 in the end portions of the replaceable bearing sections 30—31. The ends of these sections 30—31 can be beveled as at 32 for interlapping relation.

Another form of the invention is shown in Figure 2 wherein the bearing pin is denoted by numeral 33 and has one bored recess 34 in which is the spring pressed plunger 35. This plunger 35 has a beveled outer end portion which is adapted to project through the interlapping reduced end portions 36 and 37 of the sections 38 and 39, respectively. The remaining ends of the sections 38 and 39 are hook-shaped as at 40 and interlocked as suggested in Figure 2. These ends are interlocked first and the band sections forced against the bearing pin 33 until they are caught in interlapping relation by the plunger 35. Obviously as in the instance of the plungers 27, the plungers can be retracted by forcing a small instrument through an opening 41 of a band beyond the plunger.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In combination with a shaft, a bearing sleeve divided longitudinally to provide a pair of semi-cylindrical bearing sections, said bearing sections being provided with recesses on their inner surfaces, pins projecting from the shaft and into the recesses to hold the said sections to the shaft.

2. In combination with a shaft, a sleeve disposed around the shaft, said sleeve being divided into a pair of sections having overlapping edge portions, said sleeve being formed with an opening and a spring projected detent on the shaft adapted to project into the opening to hold said overlapping edge portions together.

HENRY GEORGE ANDREWS.